(12) United States Patent
Morris et al.

(10) Patent No.: US 8,550,036 B2
(45) Date of Patent: Oct. 8, 2013

(54) ANIMAL RESTRAINT SYSTEM

(76) Inventors: Jeffrey M. Morris, Clinton Township, MI (US); Benjamin J. Ogden, Oak Park, MI (US)

( * ) Notice: Subject to any disclaimer, the term of this patent is extended or adjusted under 35 U.S.C. 154(b) by 99 days.

(21) Appl. No.: 13/220,996

(22) Filed: Aug. 30, 2011

(65) Prior Publication Data

US 2013/0047934 A1 Feb. 28, 2013

(51) Int. Cl.
*B60R 22/10* (2006.01)

(52) U.S. Cl.
USPC ............................................ 119/771; 119/769

(58) Field of Classification Search
USPC ............... 119/769, 770, 771, 772, 778, 781, 119/774, 776; 292/256, 258, 288, 289, 297, 292/298, 304, 305, 306, 17, 70, 76
See application file for complete search history.

(56) References Cited

U.S. PATENT DOCUMENTS

| 2,310,827 | A | * | 2/1943 | Anderson | 24/30.5 R |
| 3,310,034 | A | * | 3/1967 | Dishart | 119/771 |
| 3,874,029 | A | * | 4/1975 | McCullough | 16/329 |
| 5,167,203 | A | * | 12/1992 | Scott et al. | 119/771 |
| 5,533,234 | A | * | 7/1996 | Bizek | 16/308 |
| 6,978,737 | B2 | * | 12/2005 | Kirch et al. | 119/769 |
| 2002/0046714 | A1 | * | 4/2002 | Simmons | 119/771 |
| 2009/0071418 | A1 | * | 3/2009 | Simons | 119/793 |
| 2009/0260198 | A1 | * | 10/2009 | Morgan et al. | 24/458 |

* cited by examiner

*Primary Examiner* — Rob Swiatek
*Assistant Examiner* — Lisa Tsang
(74) *Attorney, Agent, or Firm* — Young Basile Hanlon & MacFarlane PC

(57) ABSTRACT

A method and apparatus for restraining an animal such as a dog within an automotive vehicle equipped with a personal (human) belt-type restraint system having an inertia brake. A tether is attachable at one end to an animal harness and at the other end to a section of human restraint system webbing, the latter attachment being achieved by way of a spring biased clamp having friction pads on the inside surfaces of two complemental clamp elements. The clamp elements are closed and secured by means of a buckle or clasp such as a loop/spring bayonet clasp.

12 Claims, 3 Drawing Sheets

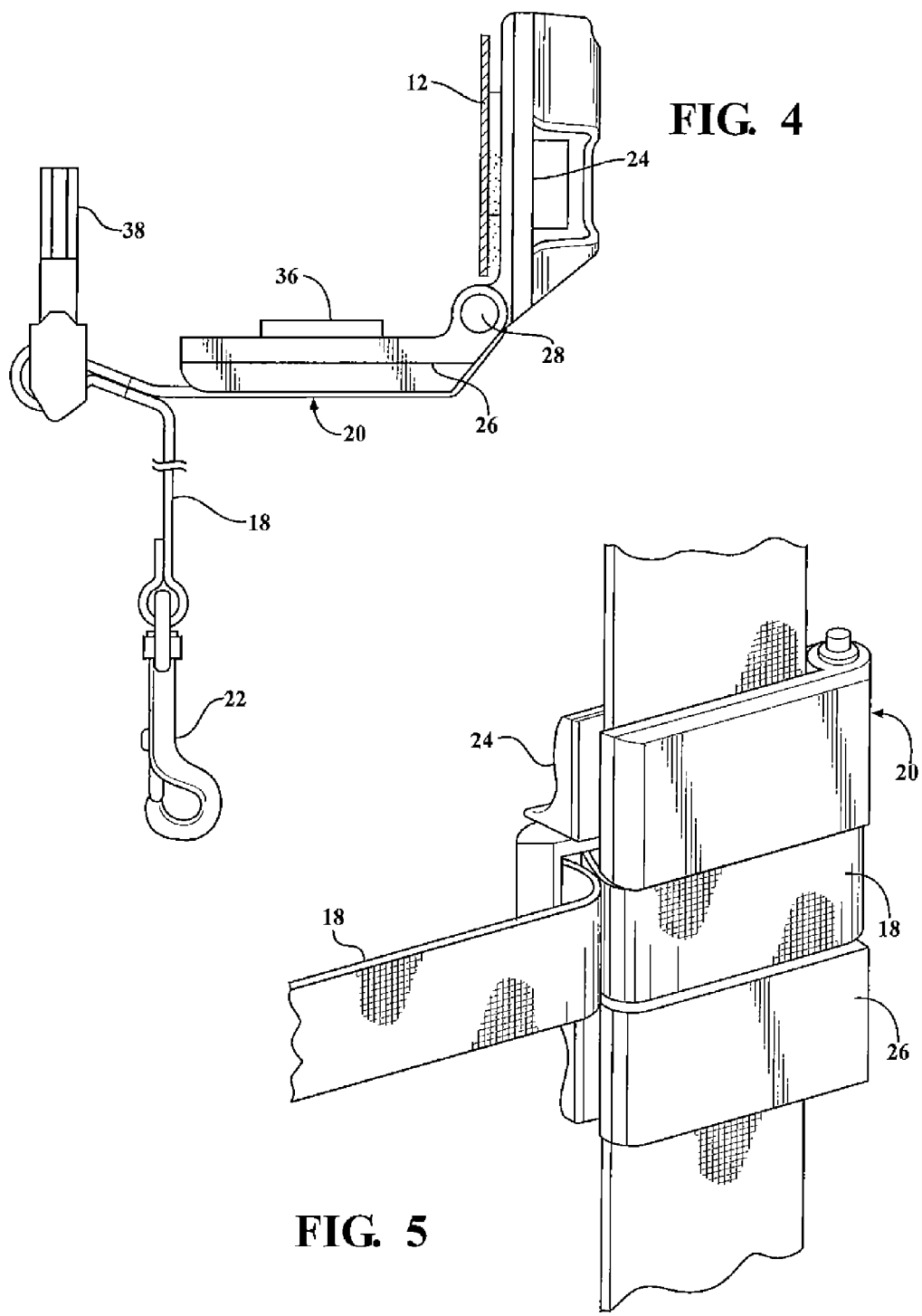

ANIMAL RESTRAINT SYSTEM

FIELD OF THE INVENTION

The invention relates to animal restraint systems and more particularly to a restraint system including a tether provided at one end with a clamp which can be releasably attached to a section of webbing in an automotive seat belt system so that the animal is free to move around in the vehicle under normal circumstances.

BACKGROUND OF THE INVENTION

Animals such as dogs are commonly transported in conventional passenger vehicles. In some cases, the animals are caged, but it is more common to allow an animal, particularly a dog, to move freely within the vehicle, a situation which poses essentially the same danger to the animal as an unrestrained human would experience in the event of a collision. In addition, there is a risk that an unrestrained animal will jump out of an open vehicle or go through an open window.

SUMMARY OF THE INVENTION

The present invention provides a device for tethering an animal, such as a dog, to the personal restraint system a passenger vehicle; i.e., the seat belt system. As used herein, the term "seat belt system" refers to a restraint system having at least one length of webbing attached to an inertia reel so as to be extendable at slow rates but which locks up when the extension rate goes up. The example shown herein is a personal restraint system including both lap and shoulder webbing portions and an inertia reel associated with the shoulder portion to allow the human occupant of the restraint system some freedom of movement under normal travel circumstances, but which locks up in the event of rapid deceleration.

In accordance with the invention, there is provided a tether having first and second ends, a fastener such as a swivel clasp attached to one end of the tether so that the tether can be conveniently attached to an appliance worn by the animal; an example of such an appliance is a body harness. Further in accordance with the invention, a releasable webbing clamp is attached to the opposite end of the tether and comprises first and second complemental plate-like clamp elements which are hingedly connected to one another so as to be movable between a closed condition, for example, a shoulder belt or harness webbing can be clamped between them, and an open position which allows a section of webbing to be either released from or inserted into the clamp. A clasp such as a bayonet/loop is provided for securing the clamp elements in the closed condition.

In the preferred form, a bias spring is used and associated with a hinged connection between the clamp elements to bias it toward the open position. Furthermore, pads of rubber or EVA are adhesively attached to the interior surfaces of the clamp elements so as to be brought into mating contact with the opposite surfaces of a webbing section whereby clamping the animal restraint to the human restraint system does no damage thereto. The tether length is adjustable and the fastener may take the form of a conventional swivel clip. The device may be made of various materials such as high-density polyethylene.

According to a second aspect of the invention, a method of restraining an animal, such as a dog, within an automotive vehicle comprises the steps of attaching one end of a tether to an appliance worn by the animal and attaching the other end of the tether by way of a clamp to a section of personal restraint system webbing, preferably a shoulder harness. Once this method is carried out, the animal is free to move about in the vehicle, within the limitations of the structural components of the system, but it is immediately restrained by the inertia lock of the human restraint system in the event of a rapid deceleration, typical of a collision or emergency braking.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying photographs, the latter being briefly described hereinafter.

BRIEF SUMMARY OF THE DRAWINGS

The description herein makes reference to the accompanying drawings wherein like reference numerals refer to like parts throughout the several views and wherein:

FIG. 4 is an end view of the clamping assembly in an open condition; and

FIG. 5 is a perspective view of the back side of the clamping system as shown in FIG. 2.

DETAILED DESCRIPTION OF THE ILLUSTRATIVE EMBODIMENT

Figure 1:
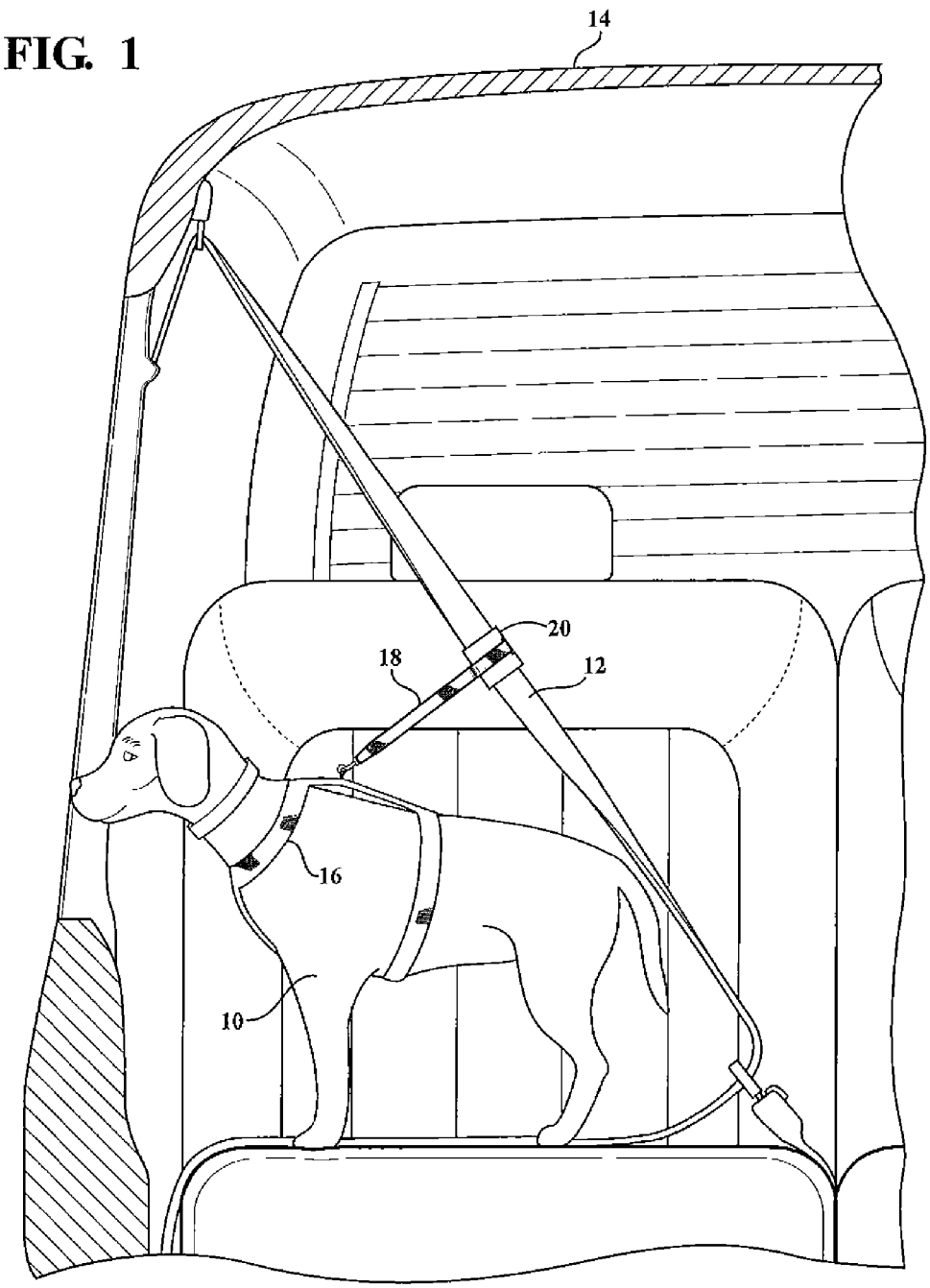
FIG. 1 is a view of the interior of a passenger vehicle wherein the invention is used to restrain a canine animal by tethering the animal to the shoulder belt portion of a personal restraint system.
Figure 2:
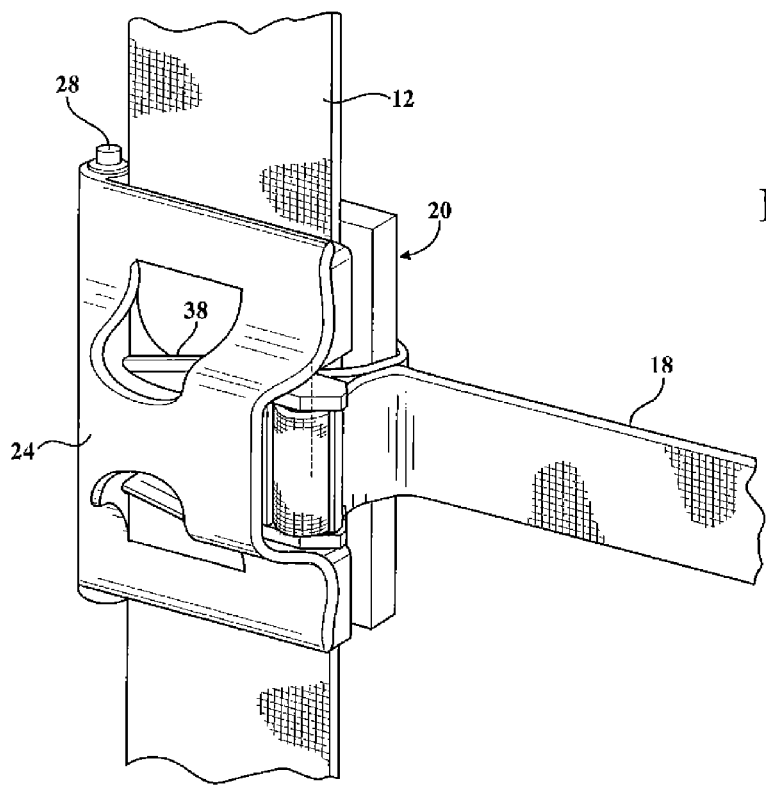
FIG. 2 is a perspective view of a clamping assembly which forms part of the illustrative embodiment of the invention wherein the assembly is in a closed condition around a length of shoulder belt webbing.

Referring to FIG. 1, there is shown a canine animal (dog) 10 which has been tethered to the shoulder belt webbing 12 of a passenger vehicle 14. The animal 10 is wearing a conventional appliance 16 in the form of a body harness and the harness is connected to the shoulder belt webbing 12 by way of a tether 18 and a clamp assembly 20, hereinafter described in greater detail with reference to FIGS. 2-5.

Looking to FIGS. 2-5, the tether 18 may be a length of leather or cloth strap having a degree of flexibility, weight and strength which suits the particular application. At the end design for attachment to the body harness 16 one sees a conventional spring clip 22 which can be conveniently operated to attach to a loop on the body harness 16 in conventional fashion.

The other end of the tether 18 is adjustably secured as shown to a clamp assembly 20 which comprises a pair of generally planar, complemental clamp elements 24, 26 connected to one another in book fashion by a hinge pin 28. Springs 30 and 32 cooperate with the hinge pin 28 to bias the clamp assembly 20 into the "open" position shown in FIG. 3. Pin guides 35, 37 are molded into the clamp elements to receive the hinge pin 28. A latch comprises a spring-finger bayonet 38 and a socket 40 in the clamp element 24 to receive the bayonet. Tether 18 is looped through the bayonet 38 so its length can be adjusted, and terminated around the pin as shown at 39 in FIG. 3. When the bayonet 38 is inserted into the socket 40, the outer fingers of the bayonet flex inwardly and then spring back out to the lock in place. The latch is released by squeezing the bayonet fingers together and pulling the bayonet out of the socket 40. The latch is similar to those commonly found in back packs.

Figure 3:
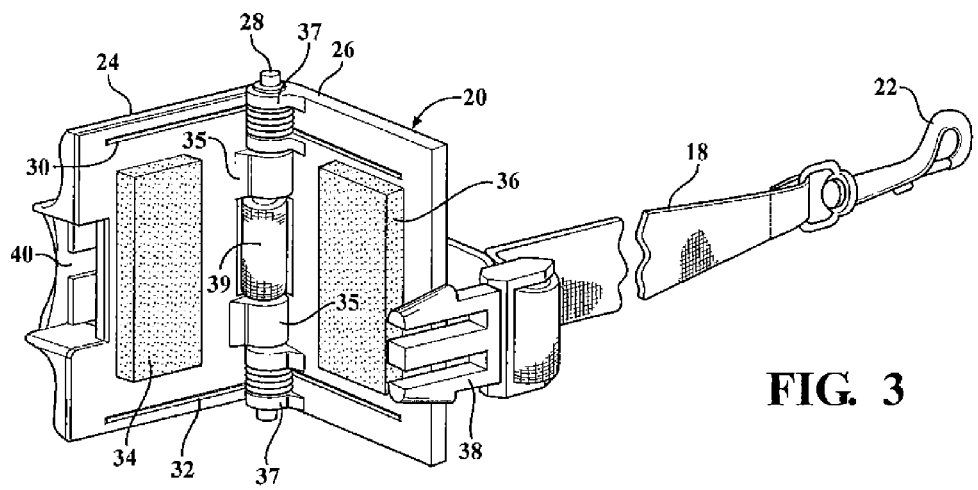
FIG. 3 is a perspective view of the clamping system of FIG. 2 in an open condition, also illustrating the attached tether.

As shown in FIG. 3, rubber or EVA friction pads 34, 36 are adhesively bonded to the inside surfaces of the plates 24, 26 respectively, to provide additional friction between the clamp assembly 20 and the webbing 12 when the clamp assembly 20 is closed to capture the shoulder belt webbing 12 as well as to prevent damage to the clamped webbing. The width of the friction pads 34 is between 2 and 3 inches to correspond essentially to the width of the webbing 12 and/or to be slightly less than the width of the webbing 12 as shown in FIG. 4. The vertical dimension of the pads 34, 36 as shown in FIG. 3 may be on the order of 3 to 4 inches. As shown in FIG. 5, element 26 is relieved to provide a lateral slot which receives the tether 18.

In use, the operator of the device attaches one end of the tether 18 to the animal 10 by way of the spring clip 22 and the body harness 16 (or a conventional collar or the like). The other end of the tether is attached to a shoulder belt webbing such as 12 which is attached to an inertia reel (not shown) to permit extension thereof at low rates, said attachment being accomplished by way of the clamp assembly 20. The operator opens the clamp assembly by way of the bayonet/slot latch 38, 40 and clamps the shoulder belt webbing 12 between the friction plates 34, 36. At that point, the latch 38, 40 is closed to hold the clamp assembly 22 at a desired point along the length of the shoulder belt webbing 12. The animal 10 is free to move about to a certain degree under these conditions but is immediately and safely restrained in the event of a rapid deceleration condition, typical of heavy braking and/or a collision.

It will be understood that while the invention has been described with reference to a specific and illustrative embodiment thereof, various changes in shape, material, componentry and other aspects of the embodiment may be modified or changed without departing from the spirit and scope of the invention as defined by the appended claims.

What is claimed is:

1. A device for restraining an animal in a vehicle equipped with a personal restraint system having lengths of webbing connected to an inertia reel, wherein the device comprises:
    a fixed length tether having first and second ends;
    a fastener attached to the first end for attachment to an appliance worn by the animal; and
    a releasable webbing clamp attached to the second end and including first and second elements hingedly connected to one another and having complementary interior clamping faces, said elements being hingedly movable between a closed condition wherein said faces are brought into close abutting proximity to clamp therebetween a length of webbing which is part of the personal restraint system and an open position in which said faces are hinged apart;
    said clamp further comprising a releasable latch for securing said elements in the closed condition; whereby the animal has a range of movement provided by the personal restraint system.

2. The device as defined in claim 1 further comprising a bias spring interconnected between said first and second elements for biasing said elements toward the open position.

3. The device as defined in claim 2 further comprising friction pads mounted on said faces in such a way as to be in clamping contact with opposite sides of said length of webbing when said length of webbing is clamped between said faces.

4. The device as defined in claim 3 wherein said friction pads are made of an elastomeric material.

5. The device as defined in claim 1 wherein said fastener is a swivel clip.

6. The device as defined in claim 1 wherein said latch has a spring bayonet and a socket for receiving said spring bayonet lockingly therein; said tether being connected to said bayonet to adjust the length of said tether between said fastener and said latch.

7. The device as defined in claim 1 where said appliance is a harness.

8. An apparatus for securing an animal while at the same time allowing a substantial degree of movement for the animal within a passenger vehicle wherein the passenger vehicle has a preinstalled personal restraint system including a length of flat webbing forming a shoulder harness that extends to an inertia reel, wherein the apparatus comprises:
    a tether having first and second ends;
    a fastener at the first end for attaching the tether to an appliance worn by the animal;
    a manually operable webbing clamp at the second end, said clamp comprising first and second elements having mating clamp surfaces with enough surface area to substantially cover a width of a portion of the length of flat webbing and being hinged together to allow the clamp to be reconfigured from an open condition in which the surfaces are apart and non-parallel and a closed condition in which the surfaces are brought together in parallel so as to firmly the portion of the length of flat webbing therebetween and prevent relative sliding of the clamp relative to the portion of the length of flat webbing; and
    a latch for selectively securing the clamp elements in the closed condition;
    a degree of allowed movement corresponding essentially to an extendibility of said shoulder harness webbing under normal vehicle operating conditions.

9. The apparatus as defined in claim 8 wherein the tether is made of an inextendible material.

10. The apparatus as defined in claim 8 wherein said clamp elements are made of molded plastic.

11. The apparatus as defined in claim 10 wherein said clamp elements have pads attached to the mating surfaces thereof to prevent damage to the portion of the length of flat webbing.

12. The apparatus as defined in claim 11 wherein the pads are made of a material which enhances friction between the clamp elements and the portion of the length of flat webbing to prevent slippage of the clamp relative to the length of flat webbing.

* * * * *